LINE PRINTING AND RECORDING METHOD AND APPARATUS

Filed July 14, 1967 10 Sheets-Sheet 1

Inventor:
Gerhard Ritzerfeld
By Michael S. Striker,
Attorney

LINE PRINTING AND RECORDING METHOD AND APPARATUS

Filed July 14, 1967

Inventor:
Gerhard Ritzerfeld
By Michael S. Striker,
Attorney

Inventor:
Gerhard Ritzerfeld
By Michael S. Striker
Attorney

LINE PRINTING AND RECORDING METHOD AND APPARATUS

Filed July 14, 1967 10 Sheets-Sheet 4

INVENTOR
GERHARD RITZERFELD
BY
Michael S. Striker
ATTORNEY

Sept. 2, 1969 G. RITZERFELD 3,464,349

LINE PRINTING AND RECORDING METHOD AND APPARATUS

Filed July 14, 1967 10 Sheets-Sheet 5

Inventor:
Gerhard Ritzerfeld
By Michael S. Striker
Attorney

LINE PRINTING AND RECORDING METHOD AND APPARATUS

Filed July 14, 1967 10 Sheets-Sheet 6

Inventor:
Gerhard Ritzerfeld
By Michael S Striker
Attorney

Sept. 2, 1969 G. RITZERFELD 3,464,349

LINE PRINTING AND RECORDING METHOD AND APPARATUS

Filed July 14, 1967 10 Sheets-Sheet 7

Inventor:
Gerhard Ritzerfeld
By Michael S. Striker
Attorney

LINE PRINTING AND RECORDING METHOD AND APPARATUS

Filed July 14, 1967

Inventor:
Gerhard Ritzerfeld
By Michael S. Striker,
Attorney

LINE PRINTING AND RECORDING METHOD AND APPARATUS

Inventor:
Gerhard Ritzerfeld
By Michael S. Striker,
Attorney

Sept. 2, 1969 G. RITZERFELD 3,464,349

LINE PRINTING AND RECORDING METHOD AND APPARATUS

Filed July 14, 1967 10 Sheets-Sheet 10

Inventor
Gerhard Ritzerfeld
By Michael S. Striker
Attorney

United States Patent Office 3,464,349

Patented Sept. 2, 1969

3,464,349

LINE PRINTING AND RECORDING METHOD AND APPARATUS

Gerhard Ritzerfeld, Franzensbader Strasse 21, Berlin-Grunewald, Germany

Filed July 14, 1967, Ser. No. 653,527
Claims priority, application Germany, July 22, 1966, R 43,750; Apr. 25, 1967, R 45,864
Int. Cl. B41j 5/32; B41l 47/46
U.S. Cl. 101—91 14 Claims

ABSTRACT OF THE DISCLOSURE

Information contained in data areas of the lines of a printing form is also contained in recording areas of corresponding lines of a record carrier. Selected lines of the printing form are printed on a copy sheet, and corresponding lines of recordings on the record carrier are sensed and recorded on the copy sheet.

CROSS-REFERENCES TO RELATED APPLICATIONS

My copending applications Ser. Nos. 583,506, 584,448, 621,723, and 633,041 disclose inventions related to the present invention.

BACKGROUND OF THE INVENTION

It is one object of the invention to provide a method and apparatus for printing, recording, and reading-out information contained in correlated lines on a printing form and a record carrier.

Another object of the invention is to control the transport of a record carrier having lines of recordings so that a sensing means reads out of those lines of the record carrier which contain the same information as lines of a correlated printing form which are selected for printing on a copy sheet.

With these objects in view, the present invention relates to a method and apparatus for line printing and recording on copy sheets.

The present invention is particularly applicable to selective duplicators which are capable of printing selected lines, or successive single lines together with a heading on different copy sheets.

While in accordance with the prior art, printed copy sheets had to be visually interpreted and manually punched to represent the printed information by recordings, the present application, and my above-listed copending applications are concerned with the problem of automatically recording on a copy sheet the same information which is imprinted thereon.

While my copending applications also disclose record carriers having areas representing the information contained in a line of the printing form, the present invention provides a single line of recording areas for each line of data areas of the printing form, and preferably the same number of recording areas in each line of the record carrier as the number of data areas in each line of the printing form, and a method and apparatus based on the use of such a record carrier.

SUMMARY OF THE INVENTION

In accordance with the method of the invention, successive lines containing data in data areas are made on a printing form, and recordings corresponding to the data are made in recording areas of successive lines of a record carrier. Selected lines of data are printed from the printing form on a copy sheet, and the record carrier is transported to positions in which lines thereof corresponding to the selected lines of the printing form are sensed so that the same information is sensed which is printed on the copy sheet. Consequently, the sensed information can be used for making lines of recordings on the copy sheet corresponding to the lines of data printed thereon and representing the same information.

Each line of the printing form has a predetermined number of data areas, and each line of the record carrier has the same number of recording areas. The recording areas of each line of the record carrier are simultaneously sensed by the same number of stationary brushes arranged in a line, and successive lines of the record carrier are successively sensed.

In each recording area four or five code fields are advantageously provided for representing, for example, the digits from 0 to 9 by combinations of code elements recorded in the code fields. It is advantageous to provide 20 recording areas if four code elements are used, and 16 recording areas if five code elements are used so that the total number of code fields in each line is 80 or 90, respectively. A corresponding number of sensing brushes must be provided for sensing all code fields in each line, and the record carrier is preferably a sheet transported in a direction transverse to its lines under a line of sensing brushes for sensing recorded holes punched into the code fields. It is preferred to provide the record carrier sheets with transporting perforations along the longitudinal edges thereof so that a sprocket wheel can be used for transporting the record carrier.

The recording is not limited to punched holes, but other recordings permitting electric, optical or magnetic sensing may be applied to the record carrier.

The apparatus according to the invention comprises printing means, preferably including a rotary printing cylinder and a counter-pressure roller cooperating with the same, for printing selected lines of a printing form on copy sheets. Transporting means transport the record carrier in a direction transverse to its lines of recording areas which correspond to data areas of corresponding lines of the printing form. Recordings in the recording areas represent the same information as data in corresponding data areas.

Sensing means are provided for sensing one line of the record carrier, and control means connect the printing means with the transporting means and more particularly the printing cylinder with a sprocket wheel transporting the record carrier, so that the record carrier carries into the sensing region of the sensing means those lines of recording areas which contain the same information as the selected lines printed by the printing means on the copy sheet.

Recording means are controlled by the sensing menas to record on the copy sheet lines of recordings representing the information read out by the sensing means from lines of the record carrier, and also represented by lines printed on the copy sheet.

In the preferred embodiment of the invention, a line cam controls a counter-pressure roller to perform a printing motion, and the line cam is automatically turned back an angular step corresponding to one line spacing after each revolution of the printing roller. Consequently, successive lines of the printing form are printed on the copy sheet.

In accordance with the invention, the transporting means of the record carrier are controlled to be stepwise shifted to successive lines whenever the line cam is set back one step, which may be effected by a known spring-loaded stepping mechanism actuated under the control of a switch operated by an actuator roll on the printing cylinder when the same approaches its position of rest.

The information read out by the sensing means from lines of the recorded carrier is advantageously stored in a storage device and decoded before supplies in the form of impulses to the recording device which makes recordings, for example punched holes, in the copy sheet. The operation of the punching device is also controlled depending on the rotation of the printing cylinder.

It is advantageous to provide a programmed switching device whose operation depends on the sensed lines of the record carrier, and on the movement of its transporting means, respectively, and which transfers the sensed information selectively to other units of the storage device or of the punching devices for the copy sheet, respectively. The switching may be carried out by an electromagnetic switching device which depends on the number of lines of the record carrier. However, the transfer of the sensed information to another unit of the storage device, or of the punching or recording device for the copy sheet, can be effected by a control recording or perforation in the same or in another line of the record carrier.

The record carrier sheet may be connected to corresponding record carrier sheets by accordion pleats so that a stack facilitating handling may be formed, while the reading out by the line of sensing means can be continuously carried out when the accordion pleats are unfolded and successive record carrier sheets form a band.

During the setting of the printing means to a new condition for printing another selected line of the printing form the record carrier sheet is correspondingly transported but during the printing operation, the record carrier is at a standstill.

In one embodiment of the invention, the line cam controlling the selection of successive lines of the printing form is connected by electromagnetic coupling means with the transporting wheels of the record carrier. In another embodiment, the line cam and the transporting wheel of the recorded carrier are simultaneously stepwise operated by independent stepping mechanisms which are simultaneously actuated by control magnets energized and deenergized by a switch under the control of an actuator rotating with the printing cylinder.

Setting of the printing means, for example, a duplicator, to the printing of successive lines of the printing form on different copy sheets, and a stepwise transport of the record carrier are interconnected, for example by one or several magnetic or core storage devices which simultaneously perform a decoding function. The stored information is transferred by means of an interrogation device from the storage device through the corresponding parts of a punching device.

It is advantageous to sense the information recorded on the copy sheet and to compare this information with information derived from the sensing means of the record carrier, so that if a different information is recorded on the copy sheet than is contained on the controlling record carrier, a signal is produced in a comparison device for stopping the machine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

SHORT DESCRIPTION OF THE DRAWING

Figure 2:
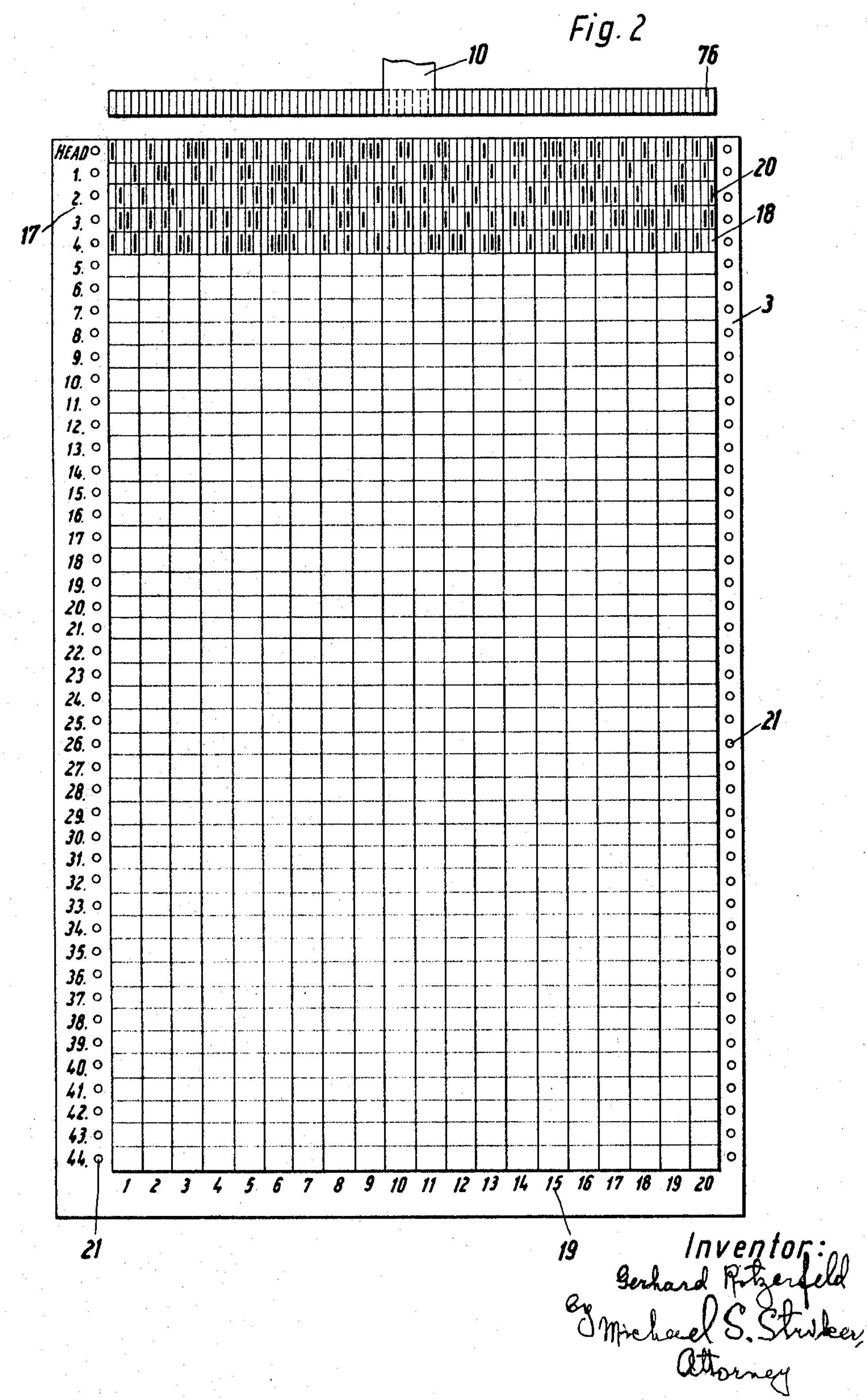
FIG. 2 illustrates a record carrier sheet, and sensing means for sensing a line of recordings on the same.
Figure 2A:
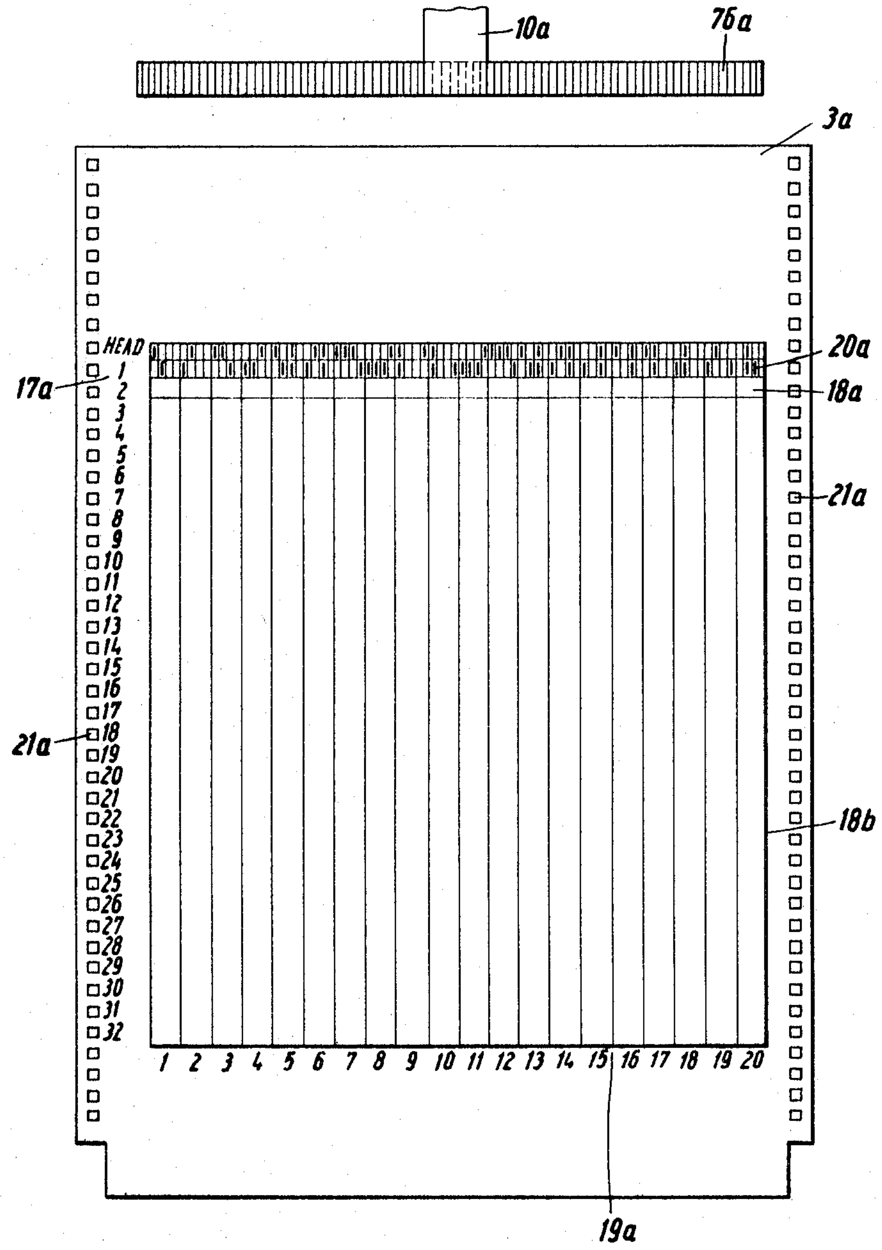
Figure 2B:
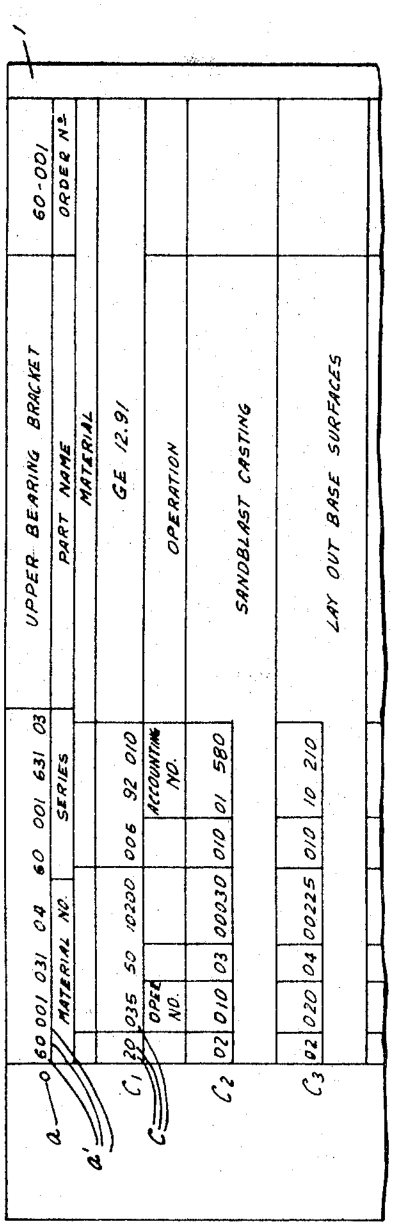
Figure 2C:
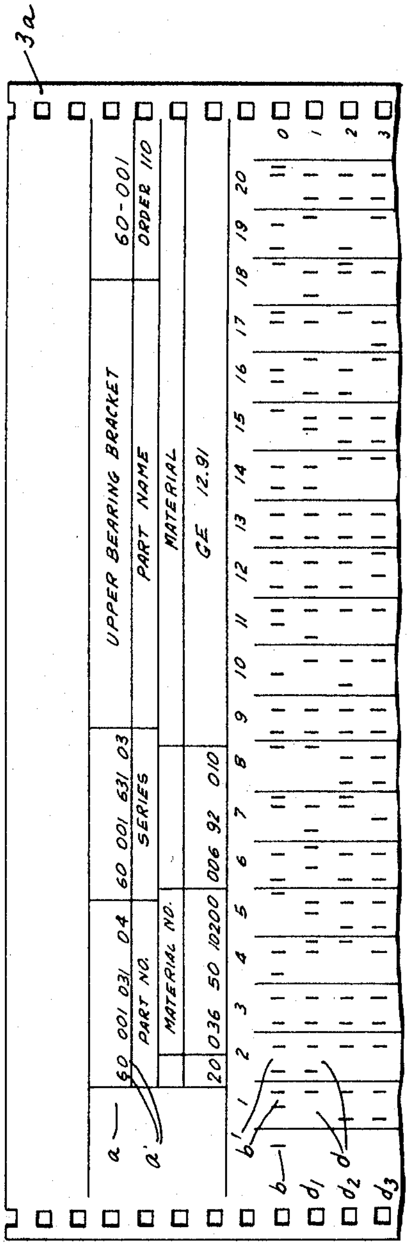
Figure 3:
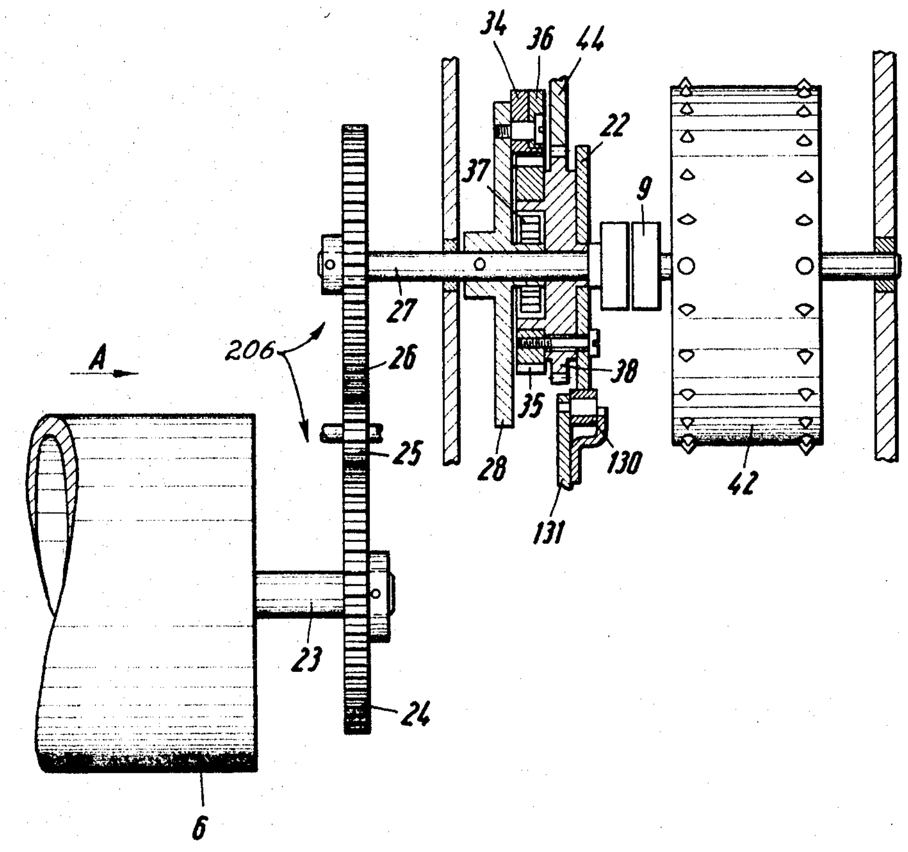
Figure 4:
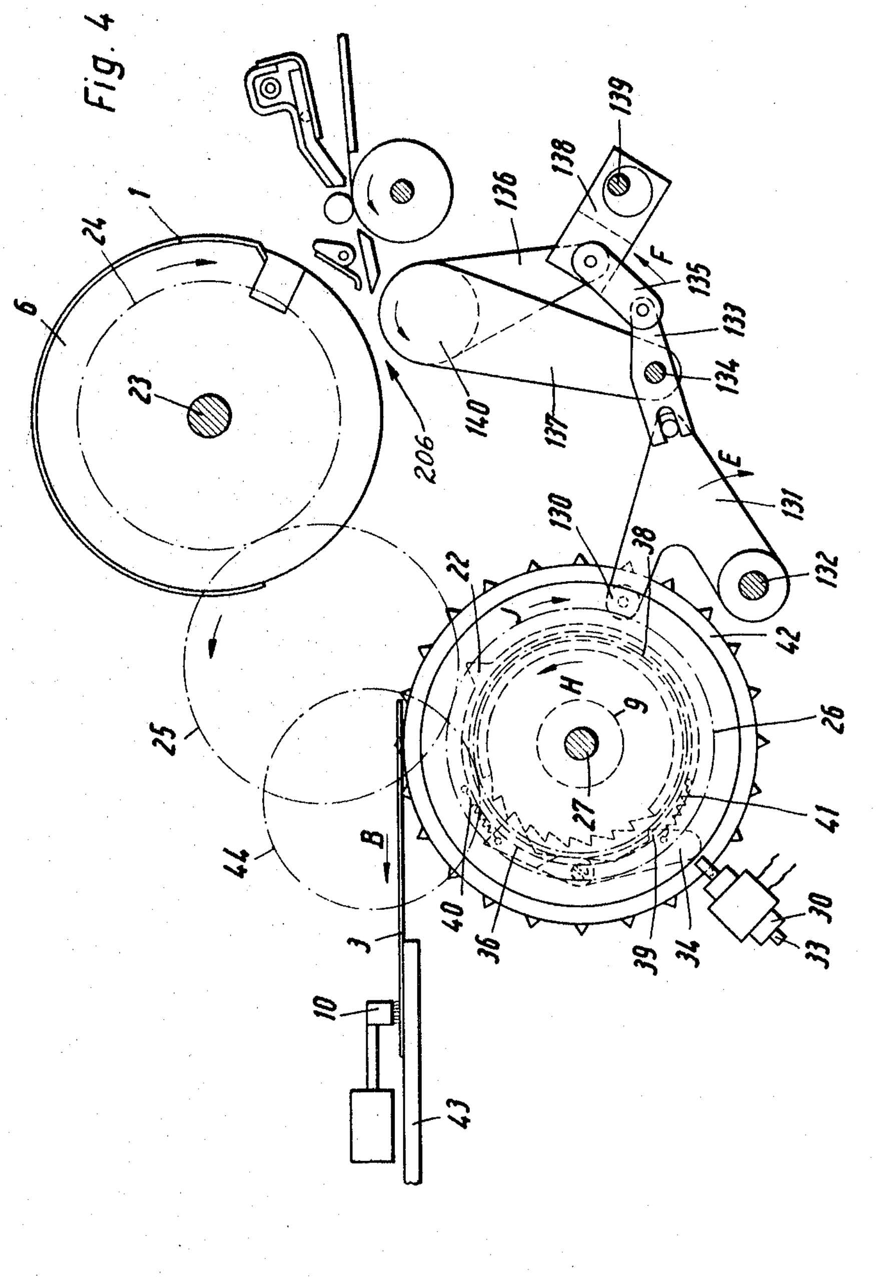
Figure 5:
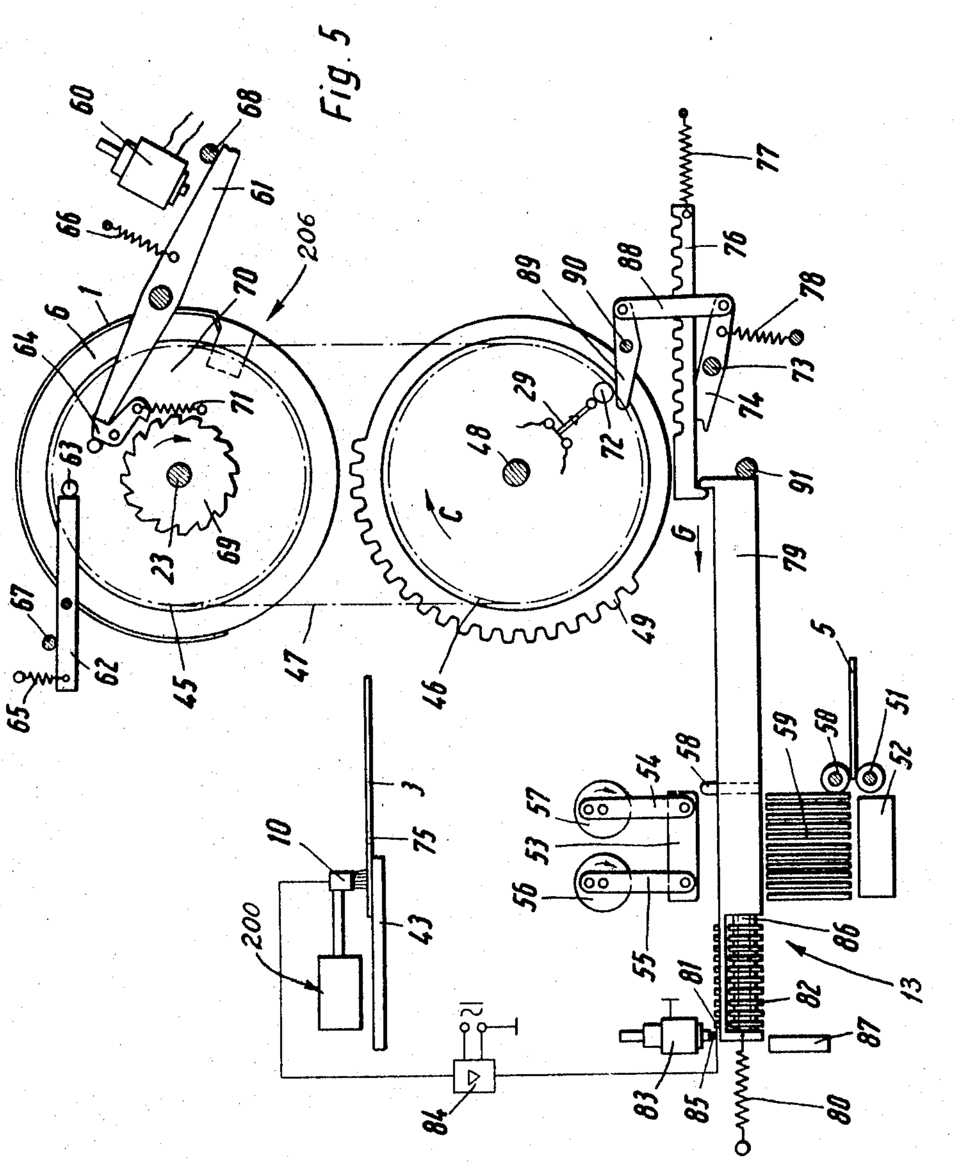
Figure 6:
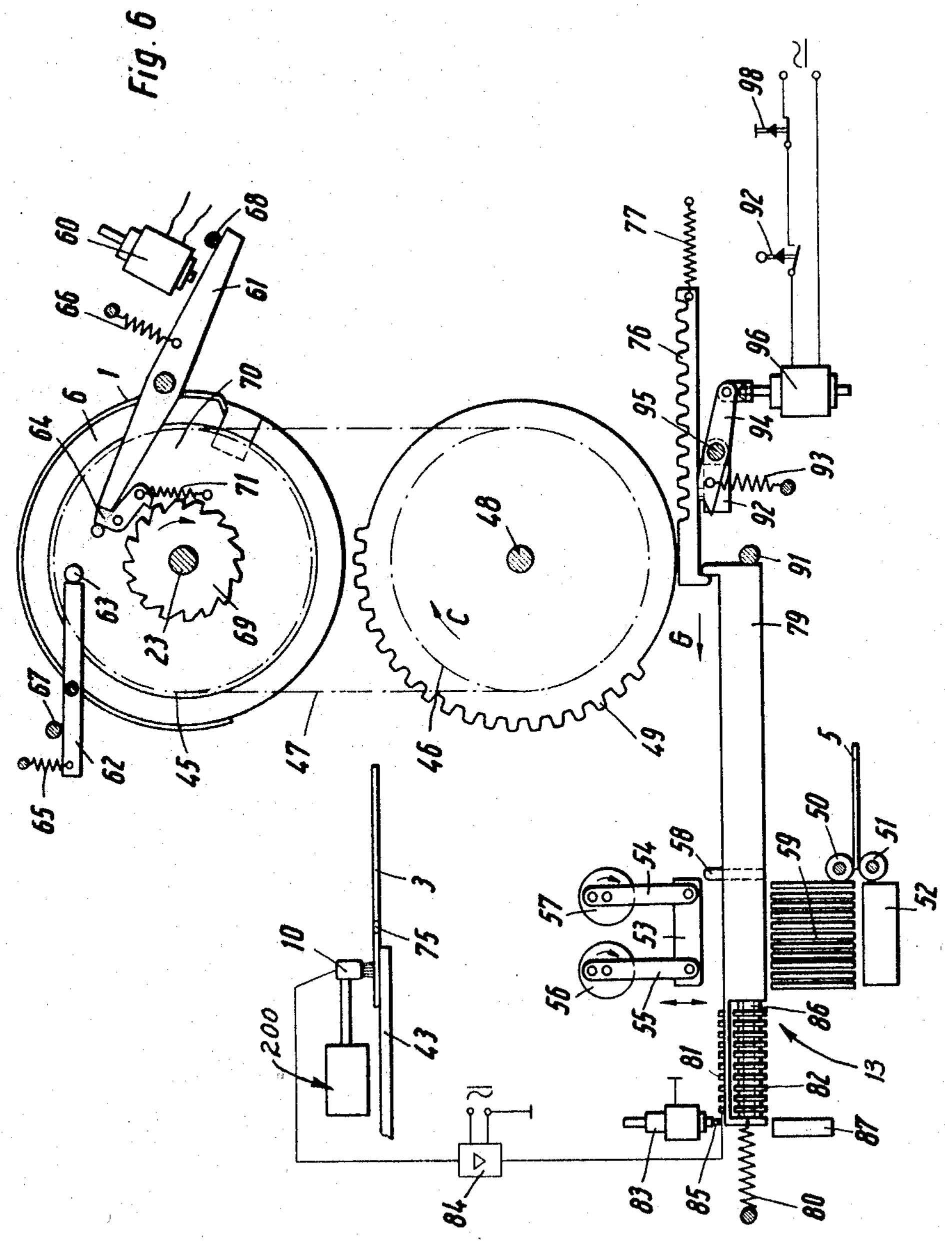
Figure 8:
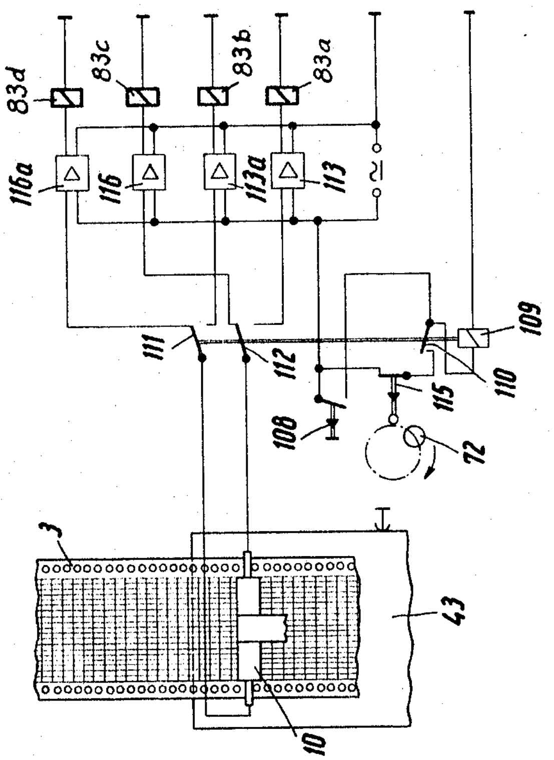
Figure 7:
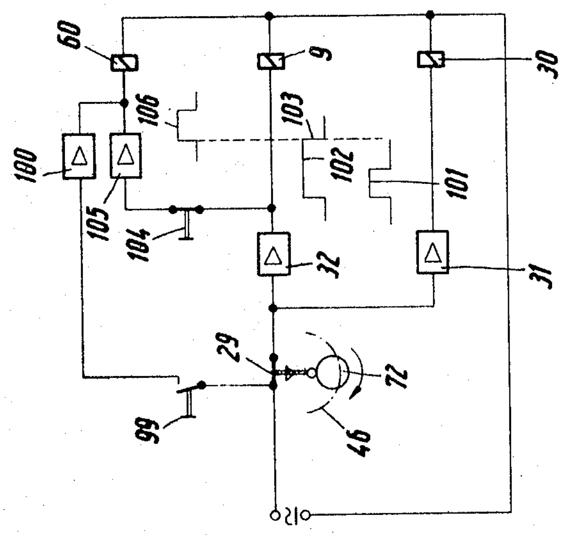
Figure 9:
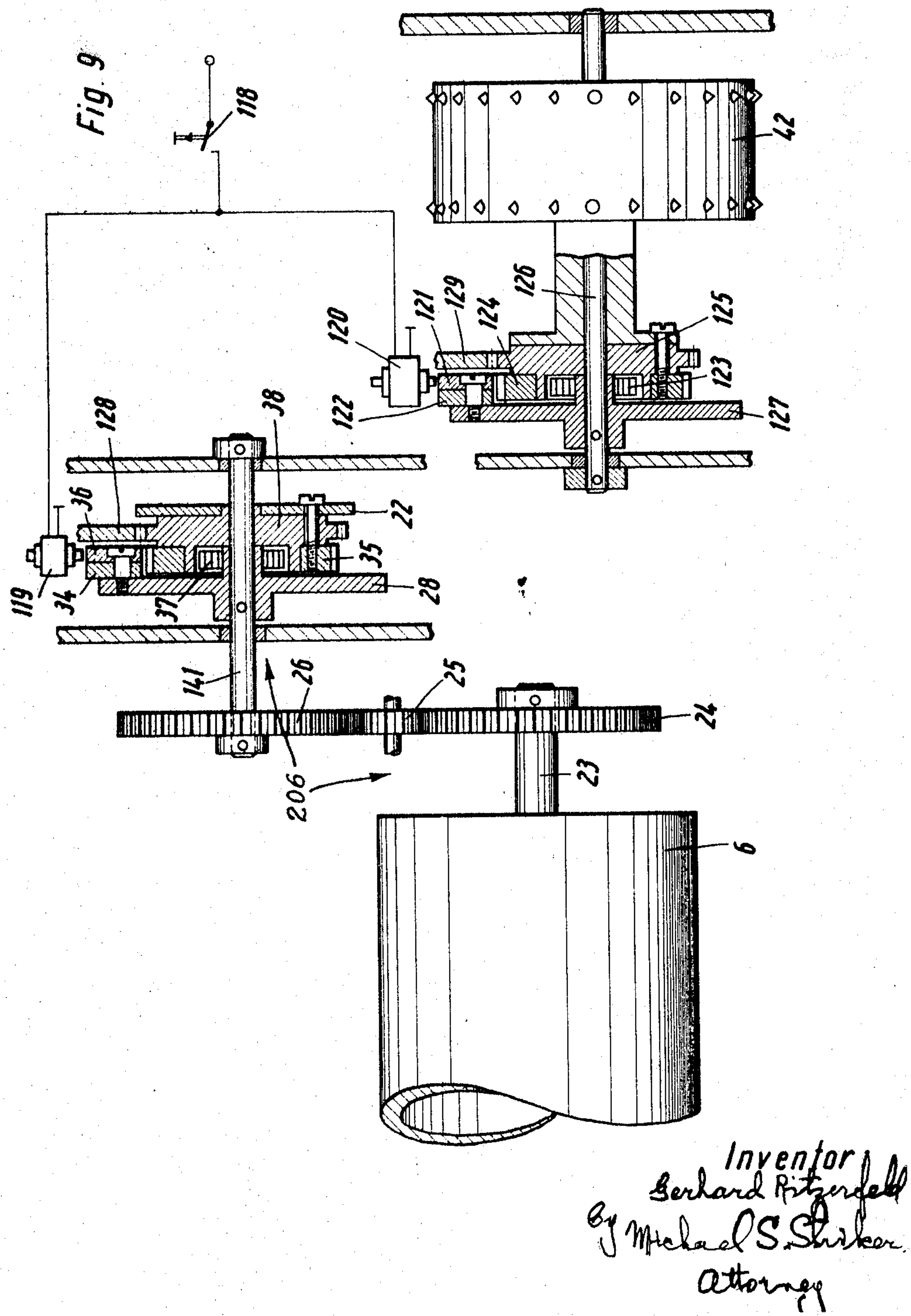

FIG. 2*a* is a view illustrating a modified record carrier and sensing means for sensing a line of recording on the same;

FIG. 2*b* is a view illustrating a printing form;

FIG. 2*c* is a view illustrating a record carrier according to FIG. 2*a* representing the printed information of the printed form of FIG. 2*b* in recorded form;

FIG. 3 is a fragmentary schematic plan view, partially in section, illustrating an embodiment of the mechanism for connecting the transporting means of the record carrier with the means by which lines of the printing form are selected for printing;

FIG. 4 is a fragmentary schematic view taken in the direction of the arrow A in FIG. 3;

FIG. 5 is a fragmentary schematic side view illustrating apparatus for punching the imprinted copy sheet under the control of the sensing means of the record carrier;

FIG. 6 is a side view of a modified construction of an apparatus serving the same purposes as the apparatus of FIG. 5;

FIG. 7 is a diagram illustrating the electric circuit for the control of the line shifting operations of the embodiment of FIG. 5;

FIG. 8 is a diagram illustrating an electric circuit for controlling the recording on the copy sheet by a punching device; and FIG. 9 is a modified construction of the mechanism shown in FIG. 3 and effecting stepwise movement of the record carrier corresponding to the selection of lines printed by the printing means on the copy sheets.

DESCRIPTION OF THE PREFERRED EMBODIMENTS

Figure 1:
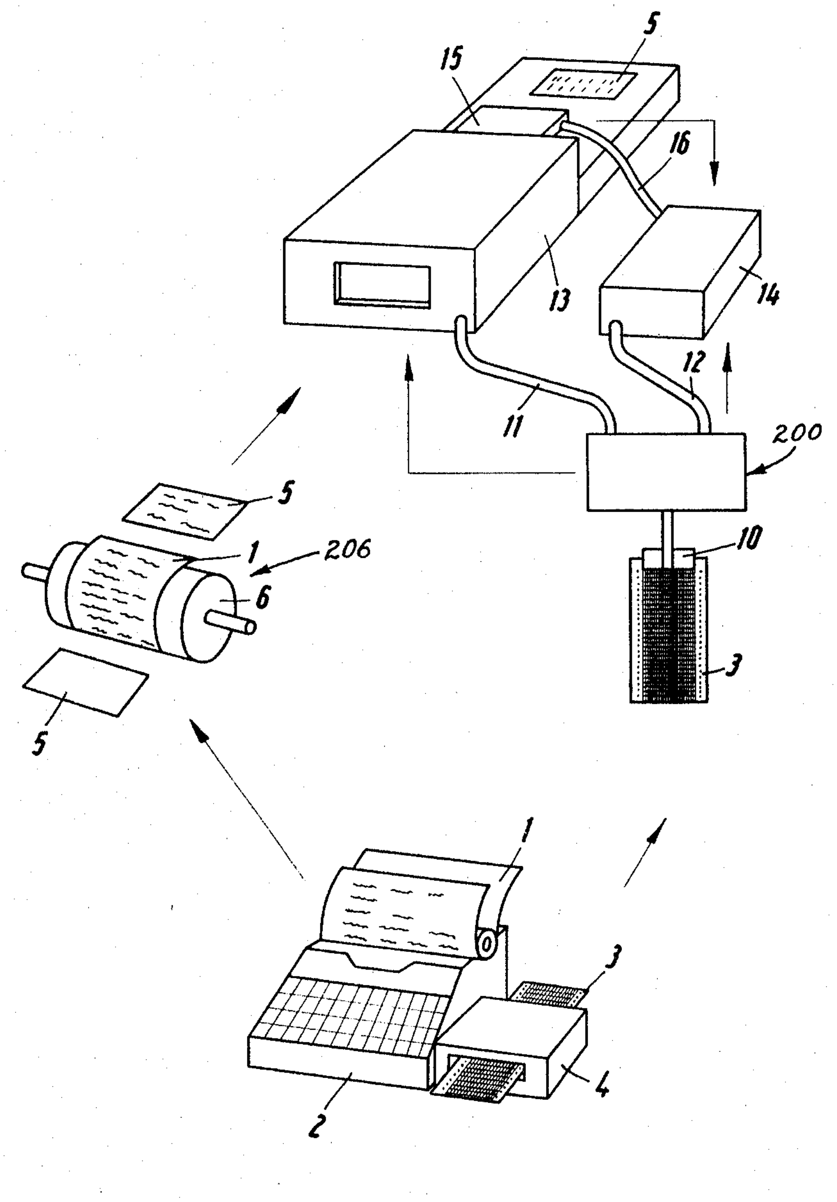
FIG. 1 is a schematic perspective view illustrating an arrangement according to the invention.

FIG. 1 schematically illustrates the method of the invention. A combined typing and recording device 2 is operated to produce lines containing data such as characters or numbers in data areas of a printing form blank 1, while simultaneously the punching device 4 produces corresponding lines of recordings in recording areas of lines of a record carrier sheet. The same number of recording areas and data areas being provided in each line of the record carrier sheet 3 and of the printing form 1. Instead of punched holes, the recording device may produce other recordings which are optically or magnetically read out.

The printing form 1 is placed on a printing cylinder 6 of a printing machine 206, which will be described in the reference to FIGS. 3, 4 and 5, and imprints of successive lines of data areas are made on the copy sheet 5. All lines of the printing form, or only selected lines, preferably with a heading or head section added, may be printed on copy sheet 5. Each line on the copy sheet has the same number of printing areas as a line on the printing form has data areas.

Successive lines of the record carrier sheet 3 are sensed by a line of sensing brush means 10 of sensing means 200, each sensing brush means sensing one of the recording areas of the record carrier sheet 3 in the respective line.

Means, not shown in FIG. 1, are provided for shifting the record carrier sheet 3 more than one line, and in synchronism with the operations of the printing means 6 so that when selected lines only of a printing form 1 are printed on copy sheet 5, the corresponding selected lines of the record carrier sheet 3 are read out by the line of sensing bush means 10.

The reading out by the sensing brush means 10 may take place during the same revolution of printing roller 6 in which copy sheet 5 is imprinted, or may follow the same one or several revolutions.

Cables 11 and 12 introduce the sensed values into a punching device 13 and a testing device 14, and a decoding translator or delaying arrangement may be interposed.

An imprinted copy sheet 5 is punched in punching device 13 with corresponding information under the control of sensing brush means 10 whereupon the punched recordings in copy sheet 5 are read out by a testing brush means 15 and introduced into the testing device 14 through cable 16 where the information recorded on copy sheets 5 is compared with the information sensed by sensing brush means 10 in record carrier sheet 3 passing through sensing device 200 so that when the comparison proves the differences in the recordings, a signal is produced by which the machine is stopped.

FIG. 2 shows a record carrier sheet 3 according to the invention to which other record carrier sheets, not shown, may be connected to form a band which is folded in accordion pleats so that the several record carrier sheets form a stack which can be easily handled, while the straightened band of the record carrier sheets can run under the line of sensing brushes 76.

The record carrier sheet 3 illustrated in FIG. 2 has the standard German DIN A4 size. The record carrier sheet has 45 lines including a head line for representing the heading of a text, and 44 text lines indicated by column 17 of numbers. Transporting holes 21 are provided along both longitudinal edges of the record carrier sheet and are used for moving the record carrier sheet in longitudinal direction to successive positions in which the lines 18 are under the line of sensing brushes 76.

In the illustrated example, each line has 20 recording areas, numbered at the bottom by a line of numbers 19. The 20 recording areas of each line 18 may be used for representing the values of digits from 0 to 9. Each area is subdivided into four fields, as shown, if a code using four elements is used for representing the digital information. However, a code employing five code elements may also be used in which event each area will have five fields. By punching only selected code fields in each area, the respective information, such as a digit is represented. In the illustrated four element code, 80 fields are provided in each line 18, and consequently 80 brushes or other sensing members 76 are provided so that all fields of a line can be simultaneously sensed. The impulses produced by the sensing brushes 76 are decoded before they are introduced into the punching device 13 described with reference to FIG. 1.

FIG. 2*a* illustrates a record carrier sheet of the same DIN A4 format which is differently laid out. Along the sides of the record carrier sheet 3*a*, transporting perforations 21*a* are provided, but the bottom edge and the lateral edges have cutouts facilitating the handling of the copy sheets, particularly the removal from the read-out device. The upper portion of the record carrier sheet is left blank and is imprinted to represent the information recorded on the record carrier sheet.

Only 32 lines are provided, corresponding to the 32 lines of a typewritten sheet of legal size. Each line **18*a* has 20 recording areas numbered at 19*a*, while the lines 18*a* are numbered at 17*a*. Each area is divided into four code fields, assuming that a code employing four code elements is used. Eighty brushes or sensing members 76*a* are required for reading out the coded information in the areas of successive lines. Vertical lines 18*b*** are advantageously printed so that an erroneously punched hole can be precisely covered by an adhesively attached piece of paper, cardboard or plastic material, depending on the material of the record carrier sheet.

FIG. 2*b* shows the upper portion of a printing form 1 correlated with a record carrier 3*a*, the upper portion of which is shown in FIG. 2*c*.

The uppermost portions of printing form 1 and record carrier **3*a*** carry the same legible information for the purposes of immediate association.

The identifying information is printed on 20 data area *a'* in the form of 20 digits in lines *a* of printing form 1 and the record carrier 3*a*, and is recorded in coded form in recording areas *b'* of the head line *b* of record carrier 3*a*. The specific information contained on lines $c_1$,$c_2$, $c_3$ of the printing form 1 in 20 data areas *c*, respectively, is represented in lines $d_1$ $d_2$, $d_3$ of the record carrier 3*a* in coded form in twently recording areas *d*, respectively. Thus, each line of the printing form contains the same information as a corresponding line of the record carrier.

In accordance with the invention, whenever a line of the printing form is printed on a copy sheet, for example line $c_2$, the corresponding line $d_2$ is read out by a row of sensing means, and recorded on the copy sheet, for example, by punched holes.

Referring now to FIGS. 3, 4, and 5, which illustrate a printing machine 206 and mechanisms for synchronizing the rotary movement of printing roller 6 with the transport of the record carrier sheet 3, the printing cylinder 6, which is mounted on a shaft 23, and carries the printing form 1, is rotated from a motor by a one revolution clutch shown in FIG. 5 which includes a pawl 64 mounted on the printing cylinder and cooperating with a ratchet wheel 69 secured to shaft 23 under the action of a spring 71. A lever 61 holds ratchet pawl 63 in the inoperative position shown in FIG. 5 due to the action of spring 66 so that lever 61 abuts a stop 68 until electromagnet 60 is energized to start the machine by turning lever 61 to a position releasing pawl 64 so that ratchet wheel 69 and shaft 23 are coupled with printing cylinder 6 and rotate the same one revolution after which pawl 64 is again moved out of the teeth of ratchet wheel 69 by lever 61. Another lever 62 biassed by spring 65 against the stop 67 abuts a stop 63 on printing cylinder 6 to prevent unintended rotation of the same in counter-clockwise direction.

Referring to FIGS. 3 and 4, shaft 23 of printing cylinder 6 is connected by a gear train 24, 25, 26, to a shaft 27 which carries a fixed stepping wheel 28. Assuming that during the next following revolution of printing cylinder 6, the next following line of the printing form 1 is to be printed on a copy sheet, the line cam 22 must make an angular step opposite to the direction of rotation J so that the record carrier 3 is shifted one step corresponding to a line spacing in the direction of the arrow B.

This operation is initiated by control means including a switch 29, see FIG. 5, operated by an actuator 72 secured to a partly toothed wheel 49 which is driven from printing roller 6 through a chain transmission 45, 46, 47. Closing of switch 29 effects energization of stepping electromagnet 30, as is apparent from FIG. 7, and as best seen in FIG. 4, electromagnet 30 has a movable armature 33 which presses the shifting pawl 34 into the stepping wheel 35 while locking pawl 36 is operated to automatically release the stepping wheel in a conventional manner permitting the spiral spring 37, see FIG. 3 to turn member 38 on shaft 27 together with line cam 22 one angular step in the direction of arrow H, whereupon a tooth flank of stepping wheel 35 abuts a tooth 39 of pawl 34.

A transporting sprocket 42 having spaced peripheral rows of teeth fitting into transporting holes 21 of the record carrier sheet, is connected with line cam 22 when the electromagnetic coupling 9 is energized which is accomplished by switch 29 as apparent from the circuit diagram of FIG. 7. The delaying means 31, 32, which will be described with reference to FIG. 7 hereinafter, effect deenergization of electromagnet 30 so that springs 40 and 41 return the pair of pawls 34, 36 to the initial position shown in FIG. 4. When pawl 34 releases the stepping wheel 35, spiral spring 37 pulls stepping wheel 35 to a position abutting a tooth of pawl 36, and line cam 22 as well as transporting wheel 42 are in positions for printing and punching of the next following line.

The printing machine illustrated in FIG. 4 is a duplicating machine provided with conventional moistening means and transporting rollers which carry the copy sheet into the printing plane between printing roller 6 and counterpressure roller 140 which is mounted on a toggle lever system 136, 137, 135, 133 on a support 138 which can be adjusted by turning the eccentric member 139 in the usual manner. Line cam 22 cooperates with a cam follower lever 131 mounted for pivotal movement on a shaft 132 and connected by a pin and slot connection with lever 133, which is turnable on pivot pin 134 on lever 137.

Assuming that during a first revolution of the printing roller 6, the first line was printed, the above-described angular step of the line cam 22 will cause the counter-pressure roller 140 to move later to the printing position then during the preceding revolution of the printing roller, so that the next following line of the printing form will be printed on the copy sheet. Since at the same time, the record carrier sheet 3 was shifted a corresponding step, by control means including switch 29 and coupling 9 connected with the transporting sprocket 42 the row of sensing brushes 10 senses the next following line of recording areas, the simultaneously sensed and printed lines containing the same information. Line cam 22 engaging roller 130 of cam follower lever 131 turns the same in a direction of the arrow E and pushes link 135 in a direction of the arrow F for raising the counter-pressure roller 140 to move later to the printing position copy sheet, not shown, and the printing form 1.

The information sensed by the line of brushes 10, 76 is entered and stored in the punching device 13, see FIGS. 1, 5, and 6, for later punching of the information into the copy sheet. A gear 44, driven by an auxiliary motor, not shown, and meshing with the gear member 38 is used for winding up spiral spring 37 so that line cam 22 and transporting wheel 42 are returned to initial position when all selected lines of the printing form have been printed and all corresponding lines of the record carrier 3 have been sensed.

Referring now to FIG. 5, transporting rollers 50 and 51 are provided for transporting a copy sheet 5 to punching device 13 after the copy sheet has been printed in the printing machine 206, as described with reference to FIG. 4. The copy sheet is fed onto an anvil 52 and under the punches 59 of punching device 13, which is schematically shown in FIG. 1. The hammer plate 53 is reciprocated by the action of two crank levers 54, 55, driven by rotary members 56, 57. Depending on the punch 59 with which a transfer member 58 cooperates, the respective punch 59 is actuated by the reciprocating plate 53 and driven through the copy sheet 5 to form a punched hole in the same.

When the above mentioned switch 29, whose function will be described in greater detail with reference to FIG. 7, is actuated by member 72, not only electromagnet 30, as described above, but also start magnet 60 is energized so that lever 61 of the one revolution clutch is operated to release pawl 64 so that the same falls into a notch in the driven coupling wheel 69 and printing cylinder 6 is rotated one revolution. In the meantime, record carrier 3 was shifted one step as described with reference to FIGS. 3 and 4, so that the line of recording areas 75, see FIG. 5, will be under the row of sensing brushes 10. During the following revolution of printing cylinder 6, rack bar 76 is transported by the gear segment 49 against the action of spring 77 so far in direction of the arrow G that a locking member 74 turnably mounted on a pivot 73 snaps behind the rear end of rack bar 76 under the action of spring 78. In the initial position shown in FIG. 5, a transverse projection on rack bar 76 is coupled with a corresponding projection on the coupling bar 79 so that the same is pulled against a stop 91 by the action of spring 77 and against the action of a spring 80, which urges coupling bar 79 to move in direction of the arrow G. However, when rack bar 76 is moved to the left by gear segment 49, spring 80 pulls coupling bar 79 also to the left, together with coupling member 58.

Ten slide contacts 81 are connected by an amplifier and decoding device 84 to each sensing brush, and when a recording is sensed in line 75, the corresponding slide contact 81 is connected to voltage. Each row of ten slide contacts on a coupling bar 79 cooperates with an electromagnet 83, which has a contact 85. A row of magnets, generally designated 83, four of which are specifically designated 83*a*, 83*b*, 83*c*, 83*d* in FIG. 8 and corresponding row of coupling bars 79 are provided. When a coupling bar 79 released by rack bar 76 moves to a position in which an energized slide contact 81 engages slide contact 85 of the respective electromagnet 83, the same is energized and operates a corresponding stop member 82 to turn about shaft 86 to a stop position engaging a fixed stop 87 during movement of coupling bar 79 so that the same is stopped in a position representing the information read out from the respective recording area of line 75 of record carrier 3. In this particular position of coupling or transfer bar 79, coupling member 58 is located opposite a specific punch 59 for coupling plate 53 with this punch 59 to produce a corresponding hole in copy sheet 5. The actuation of plate 53 is effected from printing cylinder 6 immediately or after one or two revolutions of the printing cylinder. The clearing of the punching device 13 takes place during the following revolution of printing cylinder 6 with gear segment 49 when actuating roller 72 engages lever 89 and turns the same about its pivot 90 to a position in which link 88 is raised, and locking lever 74 is turned in counterclockwise direction to release the right hand end of rack bar 76, permitting spring 77 to withdraw the rack bar 76 to the initial position shown in FIG. 5, so that coupling bar 79 is also retracted until abutting stop 91.

Referring now to FIG. 7, the main switch 99, connects a voltage source through amplifier 100 to start magnet 60 by which the one revolution clutch 61, 64, 69 is actuated. Operation of switch 99 starts the machine. Actuator roll 72 operates switch 29 to open the same directly after the start of the operation. When actuator roll 72 again arrives in the initial position, switch 29 is closed, and lever 61 of the one revolution clutch stops rotation of the printing cylinder 6.

Switch 29 is connected in series with a monostable flip-flop 31 and stepping magnet 30, and with a monostable flip-flop 32 and electromagnetic coupling 9. When switch 29 is closed in the initial position of printing cylinder 6 by actuator roll 72, the two flip-flops 31 and 32 are connected to voltage, and stepping magnet 30 is energized for the duration of the impulse 101 so that the stepping device described with reference to FIG. 4 effects stepwise movement of record carrier 3 to the next line. The magnetic coupling 9 is energized for the duration of the impulse 102 and connects the transporting wheel 42 for the record carrier 3 with the line cam 22, as described with reference to FIG. 3. This coupling connection is maintained by magnetic coupling 9 for certain time after deenergization of stepping magnet 30 so that line cam 22 and transporting wheel 42 are reliably shifted. When the monostable flip-flop 32 disconnects the magnetic coupling 9, the flank 103 of impulse 102 which passes through switch 204 operates the monostable flip-flop 105 so that start magnet 60 is energized for the duration of the impulse 106, and the next revolution of the printing cylinder is started. To stop the machine again, switch 104 is manually opened, so that start magnet 60 is not any more automatically energized by monostable flip-flop 105 and the machine stops.

Referring now to FIG. 8, record carrier sheet 3 is shown in a position located under a line of brushes 10. The contact table 43 under the record carrier 3 is connected by slide contact 43′ to ground. When the punching device 13 described with reference to FIG. 5 is cleared, and a new record carrier sheet 3 is inserted, the head line is first introduced and stored in the punching device 13 by shortly depressing switch 108 which closes the circuit of a relay 109 which operates its holding contact 10, and two other contacts 111 and 112 which are connected with the line of sensing brushes 10. Holding contact 110 is connected with the source of voltage through a switch 115 corresponding to switch 29 and operated by actuator roll 72, as described with reference to FIG. 5. Contacts 111 and 112 connect the sensing brushes with amplifiers 113, 113*a* and electromagnets 83*a*, 83*b* of the punching device 13 which correspond to electromagnet 83 described with reference to FIG. 5. Accordingly, the coupling bars 79 assume positions representing the recording in respective area of line 75, as explained above. Coupling bars 79 assume positions representing the respective sensed information and storing the same, in the present case the information contained in the head line of the record carrier sheet. Thereupon, actuator roll 72 continuing to move with printing cylinder 6 opens switch 115 corresponding to the operation of switch 29, so that relay winding 109 is de-energized, holding contact 110 opens, and the transporting wheel 42 is moved one step to place the first line of the record carrier 3 under the row of brushes 10 as explained with reference to FIG. 7. After this step, information of the first line of the record carrier following the head line is introduced into the punching device 52 through amplifiers 116, **116*a*, and electromagnets 83*c*, 83*d* corresponding to magnet 83** explained with reference to FIG. 5.

In the modification shown in FIG. 6, the actuator roll 72, switch 29, and members 89, 88 for effecting clearing of the punching device 13 are omitted. A clearing magnet 96 is connected in series with switches 92 and 98, and operates a lever 94 mounted on a pivot 95 and biased by a spring 93. Switch 92 is shown in its actual position and a second time schematically as part of the circuit connected with clearing magnet 96. The arrangement permits to introduce the information of a line for example a head line of a record sheet 3 into the punching device 52, and to print the head line together with selected other lines on a copy sheet 5.

When rack bar 76 has been pulled by gear segment 49 in the direction of arrow G so far that the trailing rear end of rack bar 76 releases the actuator of switch 92 and thus causes closing of the same, electromagnet 96 is energized since switch 98 is closed. Magnet 96 operates locking member 94 to block return movement of the rack bar. The locked rack bar permits movement of coupling bar 79 to selected positions, and after the operation has been carried out, switch 98 is operated to de-energize electromagnet 96 so that rack bar 76 returns to its initial position followed by coupling bar 79 whereby the punching device 52 is cleared.

A modified construction of the mechanism for transporting the record carrier 3 is illustrated in FIG. 9. Printing cylinder 6 of printing machine 206 is driven, as explained above, and drives a shaft 141 over a gear train 24, 25, 26. As explained above, if during the next following revolution of the printing cylinder 6, the next lower line of the printing form 1 is to be printed, the line cam 22 must make one angular step opposite to the normal printing direction of rotation. An actuator roll, not shown in FIG. 9, corresponding to actuator roll 72 in FIG. 5, operates switch 118, which is in a position corresponding to switch 29 after a printing operation while the printing cylinder 6 approaches its initial position of rest. Upon closing of switch 118, the stepping magnets 119 and 120 are energized, stepping magnet 119 corresponding to stepping magnet 30 described with reference to FIG. 4. Stepping magnets 119 and 120 simultaneously operate shifting pawls 36 and 121. Pawl 36 cooperates with locking pawl 34, spiral spring 37, stepping wheel 35, gear member 38 and line cam 22 as described with reference to FIG. 3, so that upon energization of electromagnet 119, the line cam 22 makes one angular return step. In the same manner, stepping electromagnet 120 operates a shifting pawl 121, locking pawl 122, spiral spring 123, stepping wheel 124, gear member 125, and pawl support member 127 which constitute a stepping mechanism effecting angular steps of transporting wheel 42. In this construction, the electromagnetic coupling 9 of FIG. 3 is eliminated. The stepping mechanism shown to be mounted on shaft 126 and the transporting wheel 42 may be arranged in different regions of the machine, and need not be structurally correlated with the printing roller as in the embodiment of FIG. 3.

When the stepping magnets 119 and 120 are de-energized by opening switch 118, there is stepwise movement of transporting wheel 42 and line cam 22 is completed. Gears 128 and 129 permit the winding up of the springs 137 and 123 of the two stepping mechanisms.

It will be understood that each of the elements described above, or two or more together, may also find a useful application in other types of printing and recording machines, differing from the types described above.

While the invention has been illustrated and described as embodied in an arrangement for sensing successive lines of a record carrier sheet composed of recording areas having a plurality of code fields for representing data in coded form by holes punched in the code fields, it is not intended to be limited to the details shown since various modifications and structural changes may be made without departing in any way from the spirit of the present invention.

Without further analysis, the foregoing will so fully reveal the gist of the persent invention that others can, by applying current knowledge, readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Printing and recording method comprising making on a printing form successive lines containing data in data areas; making recordings corresponding to said data in recording areas of successive lines of a record carrier; printing from said printing form selected lines of data on a copy sheet; transporting said record carrier depending on the selection of lines of said printing form in a direction transverse to the direction of said lines thereof to positions in which lines thereof corresponding to said selected lines are located in a sensing position; sensing the recording areas of said lines in said sensing position so that the same information is sensed which is printed on said copy sheet; and recording the sensed information on said copy sheet.

2. Apparatus for printing and recording, comprising printing means for printing selected lines of a printing form on copy sheets, each line of said printing form having data areas; transporting means for transporting a record carrier having lines of recording areas in a direction transverse to the line direction, said record carrier having recordings in said recording areas representing the same information as data in corresponding data areas of corresponding lines of said printing form; sensing means for sensing the recordings in recording areas of a line of said recording areas; control means connecting said printing means with said transporting means so that said transporting means are operated to place into the sensing region of said sensing means those lines of recording areas which contain the same information as the selected lines printed by said printing means; and recording means controlled by said sensing means to record on said copy sheet lines of recordings representing the information read out by said sensing means from lines of said record carrier and represented by lines printed on said copy sheet.

3. Apparatus as claimed in claim 2, wherein said transporting means include at least one transporting wheel for said record carrier; wherein said printing means include a printing cylinder for supporting said printing form; wherein said control means include a stepping mechanism controlling said printing means to print successive lines of said printing form during successive revolutions of said printing cylinder, and means for stepwise shifting said transporting wheel so that successive lines are sensed by said sensing means.

4. Method for printing and recording as claimed in claim 1, wherein each line of said printing form has a predetermined number of data areas, and each line of said record carrier has the same number of recording areas, and wherein recordings are made in said recording areas to represent the data in corresponding data areas of said printing form.

5. The method claimed in claim 4, wherein each of said recording areas consists of a selected number of code fields, wherein recordings are made in selected code fields of each recording area; and wherein all of said code fields of the recording areas of a line are simultaneously sensed.

6. The method claimed in claim 5, wherein said recording areas are rectangular, wherein said code fields are rectangular and form in each recording area a row in line direction; and wherein approximately between 80 to 90 code fields are provided and simultaneously sensed in each line.

7. The method claimed in claim 1, wherein lines of said printing form and lines of said record carrier are simultaneously made so that each line of said printing form has a predetermined number of data areas, and each line of said record carrier has the same number of recording areas; and wherein recordings in recording areas of lines of said copy sheet which represent the same information as the data in corresponding data areas of corresponding lines of said printing form printed on said copy sheet.

8. Apparatus as claimed in claim 3, wherein said printing means include a line cam stepwise shifted by said stepping mechanism; and wherein said printing means include a counter pressure roller cooperating with said printing cylinder and moved to and from a printing position by said line cam.

9. Apparatus as claimed in claim 8, including another stepping mechanism connected with said transporting wheel; said control means comprising electromagnetic means for simultaneously actuating said stepping mechanisms whereby said line cam and said transporting wheel are simultaneously shifted.

10. Apparatus as claimed in claim 9, said control means including a switch and an actuator moving in synchronism with said printing roller for operating said switch, said switch being connected into the circuit of said electromagnetic means so that said stepping mechanisms are inoperative during the printing of a line and are actuated in an initial position of said printing cylinder.

11. Apparatus as clamed in claim 8, said control means comprising electric coupling means for coupling said line cam with said transporting wheel for stepwise movement.

12. Apparatus as claimed in claim 11, said control means including a switch connected into the circuit of said electric coupling means, and an actuator moving in synchronism with said printing cylinder for operating said switch so that said couplings means is deenergized during the printing of a line, and energized in an initial position of said printing roller.

13. Apparatus as claimed in claim 3, wherein said transporting wheel is a sprocket wheel having teeth for engaging holes in said record carrier.

14. Apparatus as claimed in claim 2, comprising other sensing means for sensing recorded lines on said copy sheet; and a comparison device receiving impulses from said other sensing means representing information recorded in lines of said copy sheet, and impulses from said first mentioned sensing means representing information recorded on said record carrier in corresponding lines, and producing a signal for stopping said printing means when the recordings on said copy sheet differ from the recordings on said record carrier.

References Cited

UNITED STATES PATENTS

| | | | |
|---|---|---|---|
| 1,909,548 | 5/1933 | Pierce | 101—19 |
| 2,002,437 | 5/1935 | Maul | 101—19 X |
| 3,245,367 | 4/1966 | Ritzerfeld et al. | 101—91 |
| 3,283,701 | 11/1966 | Ritzerfeld | 101—91 |

U.S. Cl. X.R.

101—93; 197—19